United States Patent [19]

Haapakoski

[11] Patent Number: 5,218,270

[45] Date of Patent: Jun. 8, 1993

[54] METHOD AND A COUPLING FOR DECREASING THE DETRIMENTAL RADIATION CAUSED BY A CATHODE-RAY TUBE

[75] Inventor: Hannu A. Haapakoski, Salo, Finland

[73] Assignee: Salcomp OY, Salo, Finland

[21] Appl. No.: 832,530

[22] Filed: Feb. 7, 1992

[30] Foreign Application Priority Data

Feb. 7, 1991 [FI] Finland ..................... 910586

[51] Int. Cl.⁵ ............................................. H01J 5/02
[52] U.S. Cl. ........................................... 315/85; 315/1; 315/399; 361/146
[58] Field of Search ................ 315/1, 8, 364, 399, 315/85; 361/146

[56] References Cited

U.S. PATENT DOCUMENTS

| | | | |
|---|---|---|---|
| 4,045,742 | 8/1977 | Meehan et al. | 315/85 X |
| 4,634,930 | 1/1987 | Toshiyasu et al. | 315/85 X |
| 4,823,248 | 4/1989 | Ikeuchi et al. | 363/20 |

FOREIGN PATENT DOCUMENTS

| | | |
|---|---|---|
| 2163772 | 12/1971 | Fed. Rep. of Germany . |
| 2239132 | 8/1972 | Fed. Rep. of Germany . |
| 2445003 | 9/1974 | Fed. Rep. of Germany . |
| 309701 | 2/1953 | Sweden . |

OTHER PUBLICATIONS

Patent Abstracts of Japan, vol. 9, No. 258 (E-350), 16 Oct. 1985, JP-A-60 106 273 (Matsushita) 19 Jul. 1980.
Patent Abstracts of Japan, vol. 4, No. 145 (E∝29) 14 Oct. 1980, JP-A-55 095 465 (Matsushita) 19 Jul. 1980.
Patent Abstracts of Japan, vol. 2, No. 115 (E-59) 25 Sep. 1978, JP-A-53 080 129 (Matsushita) 15 Jul. 1978.
Patent Abstracts of Japan, vol. 5, No. 55 (E-52) 16 Apr. 1981, JP-A-56 006 674 (Hitachi) 23 Jan. 1981.

*Primary Examiner*—David Mis
*Attorney, Agent, or Firm*—Pennie & Edmonds

[57] ABSTRACT

The object of the disclosure is a method and a coupling for decreasing the alternating current field produced by a cathode-ray tube in the environment. The said field or radiation is at least partly due to the capacitances (C1, C2) of the anode (A) with respect, on one hand, to the deflection coil (DY) and, on the other hand, to the ground. These capacitances produce, mainly because of the return pulse of the deflection coupling, a line rate noise voltage to the anode. According to the invention, a back-off voltage (U2) opposite to the noise voltage is fed to the anode (A) of the tube either directly or via a graphitizing (G). In cases where the same high-voltage transformer (TR) functions for both the high voltage of the anode and the horizontal deflection, the winding (L) of this transformer can also be used in generating the back-off voltage (U2). The back-off voltage can thus be coupled to the anode (A) via the high-voltage capacitor (C3) of the transformer.

9 Claims, 1 Drawing Sheet

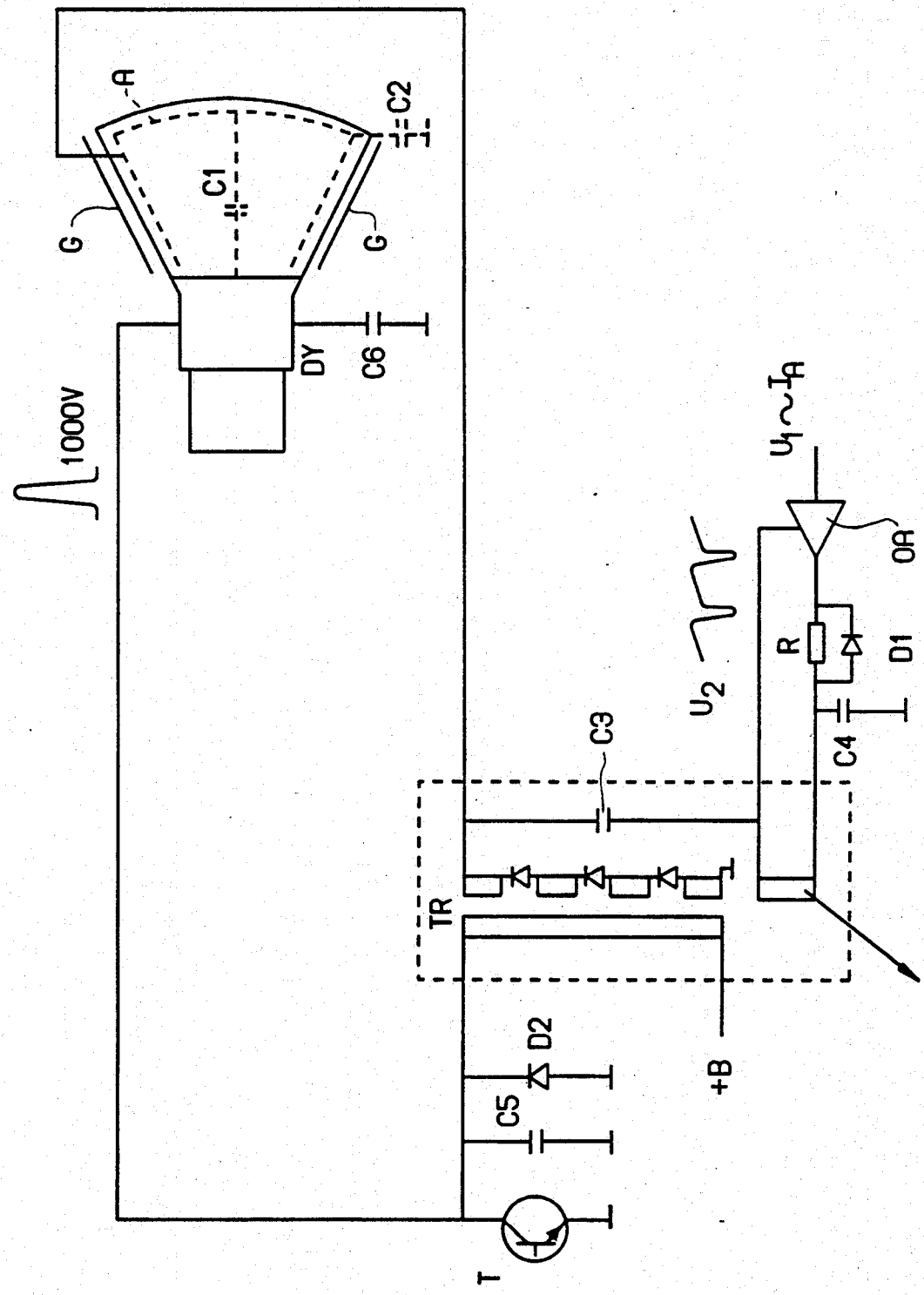

METHOD AND A COUPLING FOR DECREASING THE DETRIMENTAL RADIATION CAUSED BY A CATHODE-RAY TUBE

FIELD OF THE INVENTION

The present invention relates to a method for decreasing the detrimental radiation caused by a cathode-ray tube in its surroundings, the radiation being at least partly due to the capacitance between an anode and a deflection coil. This capacitance creates line rate noise voltage for the anode. The invention also relates to coupling devices for carrying out the said method.

BACKGROUND

Display units provided with cathode-ray tubes are increasingly being used in office work, in computer settings, process control, in laboratories etc. Therefore, special attention has begun to be paid to the detrimental electric and magnetic fields caused by visual display units and monitors especially in continuous and long-term use. The official recommendations will most likely determine limit values for both the magnetic fields and the electric fields which are in the low-frequency zone about 0 to 2 kHz (band 1) and in the high-frequency zone about 2 to 400 kHz (band 2).

The cathode-ray tube produces the band 2 type of an electrical field generally in three different ways. First, the horizontal deflecting windings of the deflection coils of the tube and the lead coupled thereto create around them an electric field proportional to the voltage in them. This voltage is known to be high, that is, a pulse-like voltage of about 1000 volts.

Secondly, the capacitance between the deflection coil and the anode of the tube provides the anode with a voltage pulse proportional to the voltage in the coils of the deflection coil, to the capacitance between the anode and the deflection coil, and to the capacitance between the anode and the ground. Thus a capacitive voltage division is created as the result of which the above-mentioned voltage pulse provides the anode with a voltage pulse according to band 2 and thus an electric field around the anode.

Thirdly, while the tube is functioning, an electron beam discharges the capacitance between the anode and the ground, which is recharged each time during a return pulse. Thus a line rate voltage resembling a saw-tooth wave is created for the anode. The voltage in turn creates an electric field of the type according to band 2.

The electric field created by the deflection coil and the leads coupled thereto can be eliminated in a relatively easy manner by packaging the cathode-ray tube in an electrically conductive housing of metal or coated plastic. Thus the electric field forward of the anode remains the only problem. This field can be attenuated by installing a conductive, light-permeable panel in front of the screen and by grounding it. This method is a very expensive solution, however. Another alternative is to increase the capacitance between the anode and the ground by a separate, high-capacitance high-voltage capacitor. This solution is also expensive and makes the high-voltage transformer impractically bulky.

SUMMARY OF THE INVENTION

The purpose of the present invention is to provide a method and a coupling for decreasing particularly the variable electric field according to the high-frequency zone, i.e. band 2.

Now the purpose of the present invention is to provide a solution which also effectively attenuates the forward electric field while being both inexpensive and simple to realize.

BRIEF DESCRIPTION OF THE DRAWINGS

In the following, the invention and the other features thereof are described in more detail in an exemplary way with reference to the appended drawing which partly scematically represents the coupling realizing the method according to the invention.

DETAILED DESCRIPTION

In the figure, the capacitance between anode A of the cathode-ray tube and deflection coil DY is indicated by reference C1 and the capacitance between the anode and the ground is indicated by C2, respectively. Capacitances C1 and C2 cause the above-mentioned voltage division resulting in line rate noise voltage coming to the anode circuit producing a alternating-current field.

This voltage is compensated according to the invention by supplying to the anode a back-off voltage having an opposite capacitance. In the implementation according to the figure, the back-off voltage is generated by using the high-voltage transformer TR of the cathode-ray tube.

To be precise, one winding L of the high-voltage transformer is coupled to the output of operational amplifier OA in the manner indicated by the figure. Voltage $U_1$ is brought to the input of the operational amplifier, the voltage being dependent on the electron beam $I_4$. This circuit further includes integrating portion R, C4 approximating the discharge of the capacitance between the anode and the ground. The circuit produces in the output thereof a back-off voltage proportional to the saw-tooth voltage of the anode, only it is negative. The voltage is then fed via winding L and the high-voltage capacitor C3 to the anode of the tube with the intent of nullifying the above-mentioned saw-tooth voltage. In addition, winding L creates a voltage proportional to the negative return pulse which nullifies the voltage produced by the deflection coil.

Thus in the case according to the figure, the existing high-voltage transformer TR and the high-voltage capacitor C3 of the cathode-ray tube is used for producing the said back-off voltage. Such a solution is appropriate in the present case where the same high-voltage transformer TR works for both the high voltage of the tube and its horizontal deflection. In addition to the high-voltage transformer, the circuit includes, in the case according to the figure transistor T, capacitor C5 and diode D2.

It is naturally also possible to produce the back-off voltage by its respective, separate circuit. This is especially so in the case where the high voltage and the horizontal deflection of the anode are operated by different circuits.

As distinct from the case according to the figure, the back-off voltage in the opposite direction from the return pulse can also be fed to the anode capacitively via graphitizing G of the picture tube.

I claim:

1. A method for decreasing the detrimental radiation radiated by a cathode-ray tube into its environment, when the radiation is at least partly due to the capacitance (C1) between an anode (A) and a deflection coil (DY), the capacitance supplying a line rate noise voltage to the anode, comprising the step of capacitively feeding a back-off voltage ($U_2$) opposite to the said noise voltage to the anode (A) of the tube, said feeding being either via a high-voltage capacitor or graphitizing (G).

2. A method according to claim 1, wherein said back-off voltage ($U_2$) is, with respect to its amplitude, a negative voltage proportional to a return pulse and/or an electron beam.

3. A method according to claims 1 or 2, wherein a common high-voltage transformer (TR) functions both for forming a high voltage of the anode (A) and forming a return pulse, and wherein said back-off voltage ($U_2$) is generated b said common high-voltage transformer.

4. A method according to claim 3, wherein said back-off voltage ($U_2$) is fed to said anode (A) via a high-voltage capacitor (C3).

5. A method according to claim 1, wherein said back-off voltage ($U_2$), is generated by a separate transformer.

6. A method according to claim 1, wherein a part of said back-off voltage ($U_2$) is formed dependent on an electron beam ($I_A$).

7. A coupling for decreasing the detrimental radiation radiated by a cathode-ray tube to be in the environment, comprising circuit elements (OA, L) for forming a negative, pulse-like back-off voltage ($U_2$) proportional to the return pulse which is coupled to said anode or to the tube being graphitized.

8. A coupling according to claim 7, wherein the same high-voltage transformer (TR) is operable in forming both the anode voltage and the return pulse, and wherein one winding (L) of the high-voltage transformer (TR) is operable in generating the said back-off voltage, whereby an amplifier (OA) can be further coupled to the winding, a signal ($U_2$) dependent of the intensity of the electron beam being coupled to the input of the amplifier.

9. A coupling according to claim 8, wherein said back-off voltage ($U_2$) is coupled from said winding (L) to the anode via said high-voltage capacitor (C3).

* * * * *